(12) United States Patent
Nakamura et al.

(10) Patent No.: US 8,107,220 B2
(45) Date of Patent: Jan. 31, 2012

(54) LAMINATED CERAMIC CAPACITOR

(75) Inventors: Tomoyuki Nakamura, Moriyama (JP); Makoto Matsuda, Moriyama (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 179 days.

(21) Appl. No.: 12/707,990

(22) Filed: Feb. 18, 2010

(65) Prior Publication Data

US 2010/0214717 A1   Aug. 26, 2010

(30) Foreign Application Priority Data

Feb. 25, 2009 (JP) ................................. 2009-041785

(51) Int. Cl.
*H01G 4/06* (2006.01)
(52) U.S. Cl. ............... 361/321.2; 361/321.1; 361/306.1; 361/306.3; 361/311; 361/313
(58) Field of Classification Search ............... 361/321.2, 361/303–305, 309, 306.1, 306.3, 311–313, 361/321.1, 321.4
See application file for complete search history.

(56) References Cited

U.S. PATENT DOCUMENTS

| | | | | |
|---|---|---|---|---|
| 5,995,360 A | * | 11/1999 | Hata et al. | 361/321.5 |
| 6,008,981 A | * | 12/1999 | Harada et al. | 361/321.4 |
| 6,570,753 B2 | * | 5/2003 | Bensaoula et al. | 361/311 |
| 6,845,002 B2 | * | 1/2005 | Moriwake et al. | 361/302 |
| 7,242,571 B2 | * | 7/2007 | Okamatsu et al. | 361/321.2 |
| 7,365,958 B2 | * | 4/2008 | Yamazaki et al. | 361/321.4 |

FOREIGN PATENT DOCUMENTS

| | | |
|---|---|---|
| JP | 2005-033070 A | 2/2005 |
| JP | 2005-243890 A | 9/2005 |
| JP | 2005-306691 A | 11/2005 |
| JP | 2008-297179 A | 12/2008 |

* cited by examiner

*Primary Examiner* — Nguyen T Ha
(74) *Attorney, Agent, or Firm* — Dickstein Shapiro LLP

(57) ABSTRACT

A laminated ceramic capacitor capable of achieving both a high dielectric constant and high electrical insulation property even when the thickness of the dielectric ceramic layer is less than 1 μm, contains a plurality of laminated dielectric ceramic layers and a plurality of internal electrodes at interfaces between the dielectric ceramic layers, where dielectric ceramic layers are made of dielectric ceramic containing a perovskite-type compound represented by $ABO_3$ as a main ingredient, and R (R is La or the like), M (M is Mn or the like) and Si as accessory ingredients. When crystal grains of the dielectric ceramic are classified into first crystal grains having grain sizes larger than one-fourth of the thickness of the dielectric ceramic layer and second crystal grains having grain sizes not larger than one-fourth of the thickness of the dielectric ceramic layer, the first crystal grains and the second crystal grains have a peak P1 and P2 of grain size distribution, and the areal percentage of the first crystal grains on a cross section of the dielectric ceramic layer is 41 to 69%.

16 Claims, 3 Drawing Sheets

LAMINATED CERAMIC CAPACITOR

BACKGROUND OF THE INVENTION

1. Field of the Invention

The present invention relates to a laminated ceramic capacitor, and in particular, to an improvement for raising the dielectric constant and electrical insulation property of a dielectric ceramic forming a dielectric ceramic layer provided in a laminated ceramic capacitor.

2. Description of the Related Art

One effective method for satisfying requirements of miniaturization and large capacity in a laminated ceramic capacitor is thinning the dielectric ceramic layers provided in the laminated ceramic capacitor. Nowadays, a dielectric ceramic layer is thinned to as small as less than 1 µm thick.

However, as the thinning of a dielectric ceramic layer progresses, it becomes difficult to ensure the electrical insulation property. Since the insulation property decreases as the number of crystal grains between internal electrodes in the dielectric ceramic layer decreases, it is necessary to decrease grain sizes of the crystal grains to some extent. On the other hand, when the grain sizes of the crystal grains are decreased, the dielectric constant of the dielectric ceramic also decreases.

Therefore, achievement of both a high dielectric constant and high insulation property is a major problem. For achieving both of these, the following techniques are known in a thin layer article in a laminated ceramic capacitor.

Japanese Unexamined Patent Publication No. 2005-243890 discloses an arrangement where crystal grains of dielectric ceramic are composed of first crystal grains having relatively large grain sizes and second crystal grains having relatively small grain sizes, the mean grain size of the first crystal grains is 0.1 to 0.3 µm, and the grain sizes of the first crystal grains are five times or more of the grain sizes of the second crystal grains. It is also disclosed that the areal percentage of the first crystal grains in one observation face of the dielectric ceramic layer is preferably 71 to 91%.

Japanese Unexamined Patent Publication No. 2005-33070 discloses an arrangement where crystal grains of dielectric ceramic include first crystal grains having relatively small diameters, and second crystal grains having larger grain sizes, and the areal percentage of the second crystal grains is smaller than 40%.

As to the thickness of a dielectric ceramic layer, both Japanese Unexamined Patent Publication No. 2005-243890 and Japanese Unexamined Patent Publication No. 2005-33070 disclose "1.5 µm or less", and in particular, Japanese Unexamined Patent Publication No. 2005-243890 discloses "around 1.0 µm". However, in the art described in Japanese Unexamined Patent Publication No. 2005-243890 and Japanese Unexamined Patent Publication No. 2005-33070, when the thickness of a dielectric ceramic layer is less than 1 µm, it is impossible to achieve both a high dielectric constant and high electrical insulation property.

SUMMARY OF THE INVENTION

In light of the above, it is an object of the present invention to provide a laminated ceramic capacitor capable of achieving both a high dielectric constant and high electrical insulation property even when the thickness of a dielectric ceramic layer is less than 1 µm.

The present invention is directed to a laminated ceramic capacitor including a plurality of laminated dielectric ceramic layers, and a plurality of internal electrodes formed along interfaces between the dielectric ceramic layers, the dielectric ceramic layers being made of dielectric ceramic containing a perovskite-type compound represented by $ABO_3$ (A containing essentially Ba, and optionally at least one of Ca and Sr, and B containing essentially Ti, and optionally at least one of Zr and Hf) as a main ingredient, and R (R being at least one of La, Ce, Pr, Nd, Sm, Eu, Gd, Tb, Dy, Ho, Er, Tm, Yb, Lu and Y), M (M being at least one of Mn, Ni, Co, Fe, Cr, Cu, Mg, Li, Al, Mo, W and V), and Si as accessory ingredients. The laminated ceramic capacitor has the following configuration for solving the technical problems described above.

Specifically, when crystal grains contained in the dielectric ceramic are classified into first crystal grains having grain sizes larger than one-fourth of the thickness of the dielectric ceramic layer and second crystal grains having grain sizes not larger than one-fourth of the thickness of the dielectric ceramic layer, the first crystal grains and the second crystal grains respectively have a peak of grain size distribution, and the areal percentage of the first crystal grains on a cross section of the dielectric ceramic layer is 41 to 69%.

In $ABO_3$ as the main ingredient of the dielectric ceramic, preferably, A contains 78 to 100% by mol of Ba, 0 to 2% by mol of Sr, and 0 to 20% by mol of Ca, and B contains 96 to 100% by mol of Ti, 0 to 2% by mol of Zr, and 0 to 2% by mol of Hf.

Preferably, respective concentrations of R, M and Si as the accessory ingredients of the dielectric ceramic fall within ranges of 0.1 to 3.0 mol, 0.2 to 5 mol and 0.1 to 3.5 mol by element, relative to 100 mol of $ABO_3$, and the ratio A/B in $ABO_3$ is 0.96 to 1.030.

According to the present invention, it is possible to achieve both a high dielectric constant and high electrical insulation property even when thinning of the dielectric ceramic layer advances to less than 1 µm thick. Therefore, it is possible to satisfactorily respond to the demands of miniaturization and large capacity of a laminated ceramic capacitor.

DETAILED DESCRIPTION OF THE INVENTION

Figure 1:
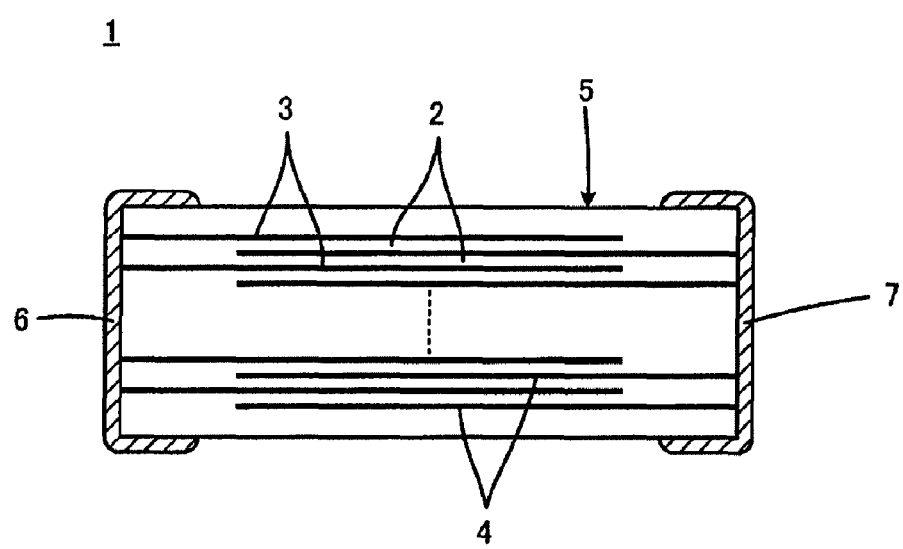
FIG. 1 is a cross section schematically showing a laminated ceramic capacitor according to one embodiment of the present invention.

Referring to FIG. 1, first, a laminated ceramic capacitor 1 according to one embodiment of the present invention will be described.

The laminated ceramic capacitor 1 has a capacitor body 5 made of a plurality of laminated dielectric ceramic layers 2, and a plurality of internal electrodes 3 and 4 formed along specific interfaces between the dielectric ceramic layers 2. The internal electrodes 3 and 4 are mainly composed, for example, of Ni.

In different positions on the outer surface of the capacitor body 5, a first and a second external electrodes 6 and 7 are formed. The external electrodes 6 and 7 are mainly composed, for example, of Cu. In the laminated ceramic capacitor 1 shown in FIG. 1, the first and second external electrodes 6 and 7 are formed on end faces that are opposite to each other of the capacitor body 5. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are alternately arranged in the direction of lamination.

The dielectric ceramic forming the dielectric ceramic layers 2 contains a perovskite-type compound represented by $ABO_3$ (A contains essentially Ba, and optionally at least one of Ca and Sr, and B contains essentially Ti, and optionally at least one of Zr and Hf) as a main ingredient, and R (R is at least one of La, Ce, Pr, Nd, Sm, Eu, Gd, Tb, Dy, Ho, Er, Tm, Yb, Lu and Y), M (M is at least one of Mn, Ni, Co, Fe, Cr, Cu, Mg, Li, Al, Mo, W and V), and Si as accessory ingredients.

In the $ABO_3$ main ingredient of the dielectric ceramic, preferably, A contains 78 to 100% by mol of Ba, 0 to 2% by mol of Sr, and 0 to 20% by mol of Ca, and B contains 96 to 100% by mol of Ti, 0 to 2% by mol of Zr, and 0 to 2% by mol of Hf.

Preferably, respective concentrations of R, M and Si as the accessory ingredients of the dielectric ceramic fall within the ranges of 0.1 to 3.0 mol, 0.2 to 5 mol and 0.1 to 3.5 mol by element, relative to 100 mol of $ABO_3$, and a ratio A/B in $ABO_3$ is 0.96 to 1.030.

Figure 3:
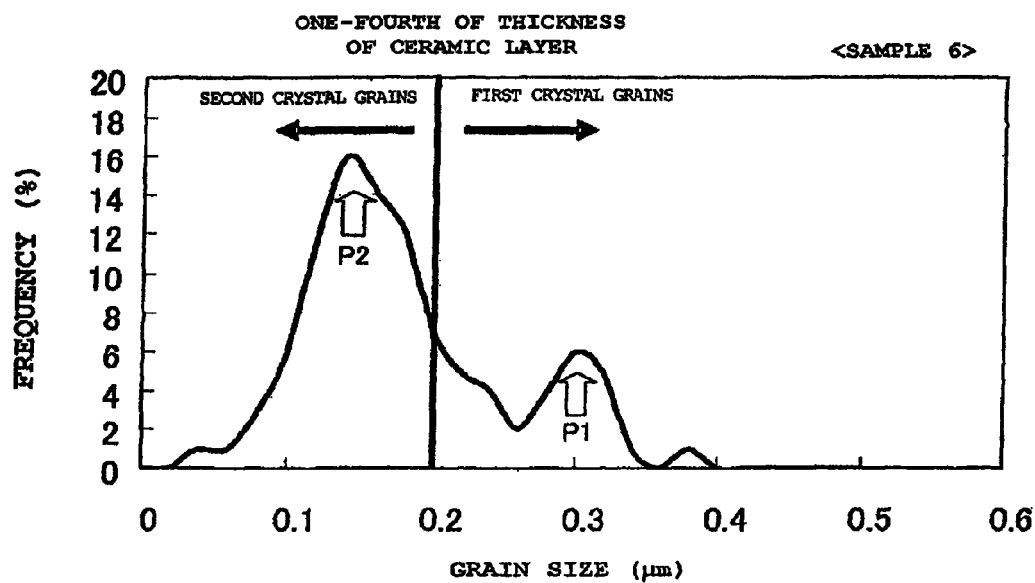
FIG. 3 is a view showing grain size distribution of dielectric ceramic according to Sample 6 within the scope of the present invention, prepared in a test example.

In the laminated ceramic capacitor 1, the dielectric ceramic forming the dielectric ceramic layers 2 has grain size distribution of crystal grains having at least two peaks P1 and P2 as exemplified for later-described Sample 6 in FIG. 3. When the crystal grains are classified into first crystal grains having grain sizes larger than one-fourth of the thickness of the dielectric ceramic layer 2 and second crystal grains having grain sizes not larger than one-fourth of the thickness of the dielectric ceramic layer 2, the first crystal grains have a peak P1 of grain size distribution, and the second crystal grains have a peak P2 of grain size distribution. Further, the areal percentage of the first crystal grains on a cross section of the dielectric ceramic layer 2 is 41 to 69%.

Figure 2:
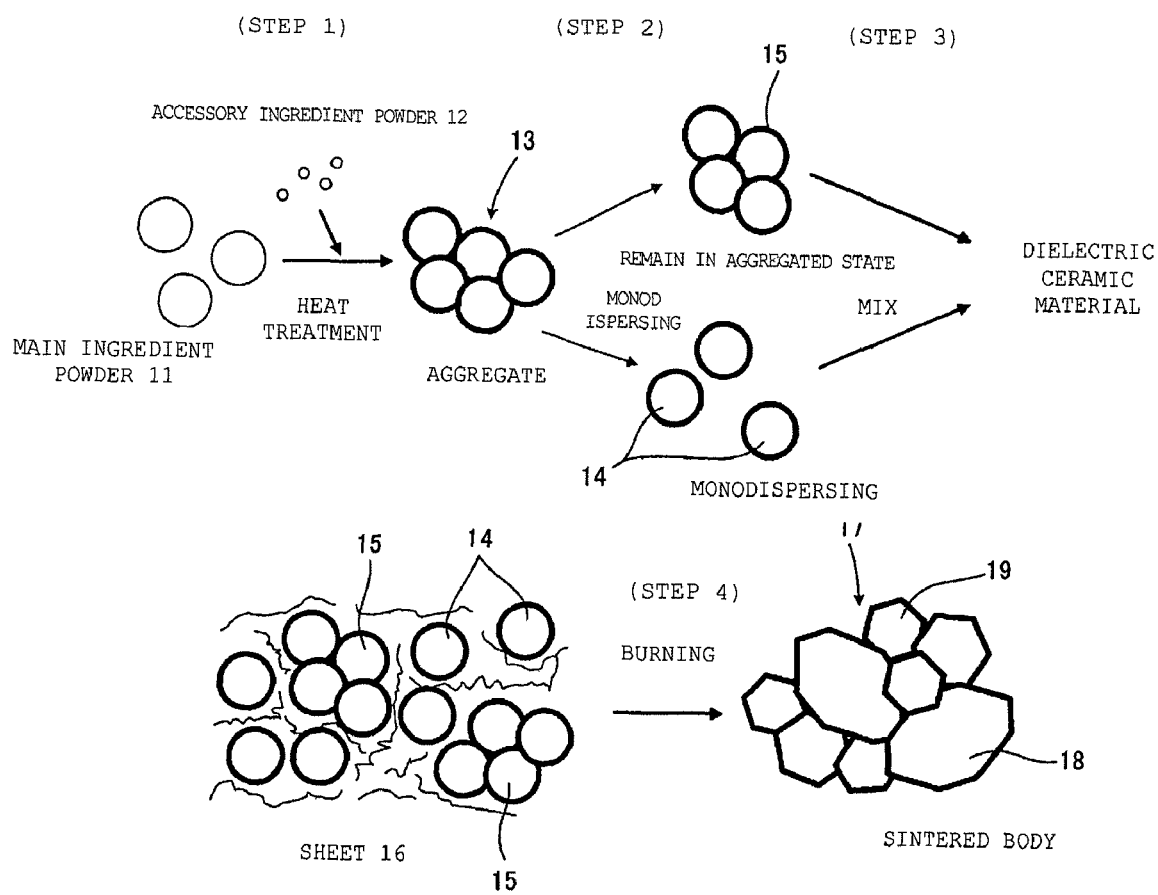
FIG. 2 is a view for illustrating a preferred method of producing dielectric ceramic forming a dielectric ceramic layer provided in the laminated ceramic capacitor shown in FIG. 1.

The dielectric ceramic having the characteristic ceramic structure described above is preferably produced in the following manner. Referring FIG. 2, a preferable production method of the dielectric ceramic will be described.

First, as a starting material, main ingredient powder 11 like $BaTiO_3$, and accessory ingredient powder 12 like $Dy_2O_3$, $MgCO_3$, $MnCo_3$ and $SiO_2$ are prepared, which are then mixed and subjected to a heat treatment (Step 1). By this heat treatment, the mixture 13 of the main ingredient powder 11 and the accessory ingredient powder 12 aggregates.

Then a part of the mixture 13 is subjected to a monodispersing treatment as much as possible, to obtain monodisperse particles 14, while the remaining part thereof is not subjected to a specific treatment so that it remains in the aggregated state as aggregated particles 15 (Step 2).

Next, the monodisperse particles 14 and the aggregated particles 15 are mixed in a predetermined ratio, to obtain a dielectric ceramic material (Step 3).

Next, a ceramic slurry in which the dielectric ceramic material is dispersed is prepared, and the ceramic slurry is formed into a sheet, to obtain a ceramic green sheet 16. In the ceramic green sheet 16, the monodisperse particles 14 and the aggregated particles 15 are present in the predetermined ratio.

For producing the laminated ceramic capacitor 1 as shown in FIG. 1, the capacitor body 5 in a raw state is prepared through the process of laminating the ceramic green sheets 16, and burnt, to obtain a dielectric ceramic 17 as a sintered body (Step 4).

In the dielectric ceramic 17, there are crystal grains of various sizes, and these crystal grains are classified into first crystal grains 18 having relatively large grain sizes, more concretely, grain sizes larger than one-fourth of the thickness of the dielectric ceramic layer 2, and second crystal grains 19 having relatively small grain sizes, more concretely, grain sizes not larger than one-fourth of the thickness of the dielectric ceramic layer 2. The first crystal grains 18 having relatively large grain sizes mainly originate from the aggregated particles 15, and each of the aggregated particles 15 becomes one sintered body during burning (Step 4) to form the first crystal grains 18. On the other hand, the second crystal grains 19 having relatively small grain sizes mainly originate from the monodisperse particles 14, and even after burning, the sizes are substantially kept disparate to become the second crystal grains 19. When diameters of the monodisperse particles 14 are relatively large, they can become not only the second crystal grains 19 but also the first crystal grains 18 by sintering.

In this manner, by varying the ratio between the aggregated particles 15 and the monodisperse particles 14, it is possible to control the abundance ratio between the first crystal grains 18 and the second crystal grains 19 in the dielectric ceramic 17 as a sintered body. Also by the degree of aggregation of the aggregated particles 15, it is possible to control the grain sizes of the first crystal grains 18. By controlling the abundance ratio between the first crystal grains 18 and the second crystal grains 19 and the degree of aggregation of the aggregated particles 15, it is possible to control the areal percentage of the first crystal grains 18 on a cross section of the dielectric ceramic layer 2.

In the following, test examples carried out according to the present invention will be described.

Test Example 1

(A) Preparation of Dielectric Ceramic Material

First, as a starting material of the main ingredients, powders of $BaCO_3$ and $TiO_2$ were prepared, and these powders were weighed so that a composition of $BaTiO_3$ was established, and then mixed by a ball mill, and heat-treated at 1150° C. to obtain a $BaTiO_3$ powder. The mean particle size of the powder was 0.15 μm and the Ba/Ti ratio was 1.001.

On the other hand, as the accessory ingredients, powders of $BaCO_3$, $Dy_2O_3$, $MgCO_3$, $MnCO_3$ and $SiO_2$ were prepared.

Then, the $BaTiO_3$ powder was stirred in water as a medium for 24 hours by a ball mill so that monodispersing was effected as much as possible. Next, the accessory ingredient powders were added, mixed for 24 hours by a ball mill, and then evaporated and dried. In this mixture, the blending proportions of the accessory ingredients were selected so that $BaCO_2$ was 1 mol, $Dy_2O_3$ was 0.5 mol, $MgCO_3$ was 1 mol, $MnCO_3$ was 0.3 mol, and $SiO_2$ was 1.5 mol, relative to 100 mol of $BaTiO_3$.

Then, this mixture was heat-treated at 500° C. for two hours, to enhance the aggregation.

Thereafter, a part of the mixture was treated for 12 hours in water as a medium by a ball mill so that monodispersing was effected as much as possible. The remaining part of the mixture was not subjected to any treatment so that it remained in the aggregated state. The monodisperse particles after the monodispersing treatment and the aggregated particles in the aggregated state were mixed in several different ratios, and thus, a plurality of kinds of dielectric ceramic materials capable of giving different mean grain sizes, different grain size distributions, and different areal percentages shown in Table 1 as will be described later were obtained.

(B) Preparation of Laminated Ceramic Capacitor

To the dielectric ceramic material powder, a polyvinylbutyral-based binder and an organic solvent such as ethanol were added, and wet-mixed by a ball mill, to prepare a ceramic slurry.

Then, the ceramic slurry was formed into a sheet by the doctor blade method, to obtain a rectangular ceramic green sheet.

On the ceramic green sheet, a conductive paste containing Ni was screen-printed, to form a conductive paste film to become an internal electrode.

Thereafter, a plurality of the ceramic green sheets on which the conductive paste film was formed were laminated so that the sides on which the conductive paste film was drawn out were alternated, to obtain a raw laminate to become a capacitor body.

Then the raw laminate was heated to 300° C. in an $N_2$ atmosphere to remove the binder, and then burnt for 2 hours at 1150° C. in a reductive atmosphere of $H_2$—$N_2$—$H_2O$ gas at an oxygen partial pressure of $10^{-10}$ Pa, to obtain a capacitor body formed by sintering the raw laminate.

On both end faces of the obtained capacitor body, a Cu paste containing $B_2O_3$—$Li_2O$—$SiO_2$—BaO-based glass frit was applied, and burnt at 800° C. in an $N_2$ atmosphere, to form external electrodes electrically connected with the internal electrodes, whereby a laminated ceramic capacitor to be a sample was obtained.

The outer dimensions of the laminated ceramic capacitor thus obtained were 0.5 mm in width, 1.0 mm in length and 0.5 mm in thickness. The number of the effective dielectric ceramic layers was 300, and the opposing area of the internal electrodes per one layer was 0.3 mm$^2$.

Also, a cross section of the laminated ceramic capacitor of each sample was polished, and observed with an electron microscope (SEM). Based on the observed image, the thickness of the dielectric ceramic layer sandwiched between the internal electrodes was measured. As a result, the thickness of the dielectric ceramic layer was 0.8 μm except for Samples 12 and 13. The thickness of the dielectric ceramic layer of Sample 12 was 1.6 and the thickness of the dielectric ceramic layer of Sample 13 was 2.4 μm.

(C) Analysis of Ceramic Structure

A cross section of the laminated ceramic capacitor according to each sample was polished, heat-etched at a temperature lower than the burning temperature approximately by 100° C., and observed with an electron microscope.

Based on the observed image, an equivalent circle diameter was determined for 200 or more observed grains. When the equivalent circle diameter thus determined was not more than one-fourth of the thickness of the dielectric ceramic layer (0.2 μm in Sample 6 and Sample 3 shown in FIG. 3 and FIG. 4), the grain was classified as the second crystal grains, whereas when the equivalent circle diameter was more than one-fourth of the thickness of the dielectric ceramic layer, the grain was classified as the first crystal grains. The mean grain size was determined for the first and second crystal grains, respectively.

Further, based on the observed image, for each of the first and second crystal grains, the areal percentage on the cross section of the dielectric ceramic layer was determined.

Figure 4:
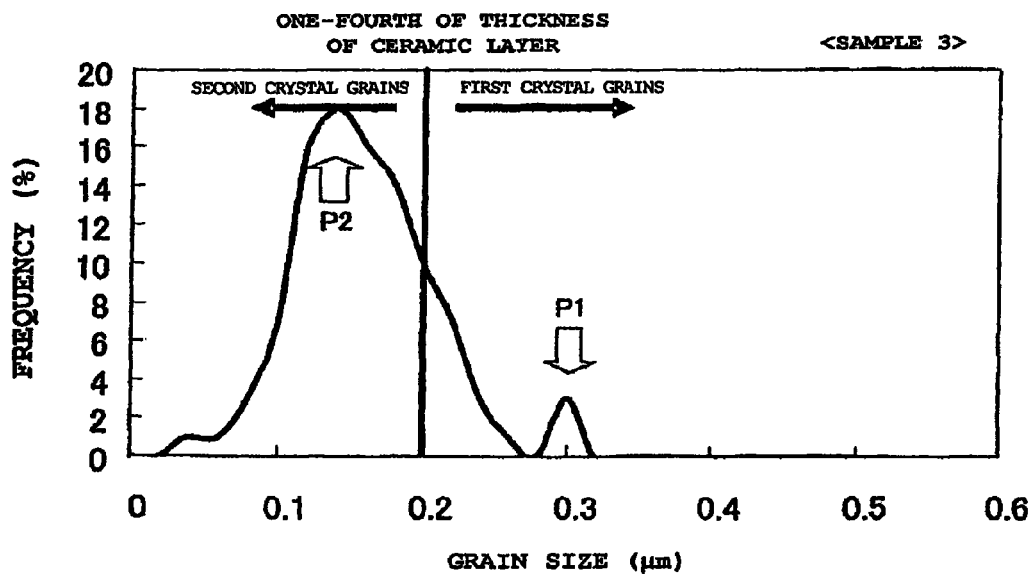
FIG. 4 is a view showing grain size distribution of dielectric ceramic according to Sample 3 out of the scope of the present invention, prepared in a test example.

Further, from the equivalent circle diameters of 200 or more crystal grains determined based on the observed image as described above, the grain size distribution was calculated for representation in a graph separated into two regions at one-fourth of the thickness of the dielectric ceramic layer. Representatively, FIG. 3 is a graph of grain size distribution for Sample 6, and FIG. 4 is a graph of grain size distribution for Sample 3. Presence of the peaks P1 and P2 of grain size distribution was determined in each region of the first and second crystal grains. The term "peak" used herein refers to one exhibiting a frequency of 2% or higher.

These results are shown in Table 1.

TABLE 1

| Sample No. | Mean grain size [μm] First crystal grains | Mean grain size [μm] Second crystal grains | Presence of peak First crystal grains | Presence of peak Second crystal grains | Areal percentage % First crystal grains | Areal percentage % Second crystal grains |
|---|---|---|---|---|---|---|
| 1* | 0.24 | 0.15 | Absent | Present | 2 | 98 |
| 2* | 0.25 | 0.16 | Absent | Present | 15 | 85 |
| 3* | 0.24 | 0.15 | Present | Present | 30 | 70 |
| 4 | 0.26 | 0.15 | Present | Present | 41 | 59 |
| 5 | 0.28 | 0.15 | Present | Present | 52 | 48 |
| 6 | 0.28 | 0.14 | Present | Present | 58 | 42 |
| 7 | 0.27 | 0.16 | Present | Present | 69 | 31 |
| 8* | 0.28 | 0.18 | Present | Present | 77 | 23 |
| 9* | 0.29 | 0.19 | Present | Absent | 98 | 2 |
| 10* | 0.24 | 0.18 | Absent | Present | 49 | 51 |
| 11* | 0.25 | 0.18 | Present | Absent | 67 | 33 |
| 12 | 0.55 | 0.29 | Present | Present | 60 | 40 |
| 13 | 0.83 | 0.4 | Present | Present | 55 | 45 |

(D) Evaluation of Electrical Characteristics

The dielectric constant and insulation resistance (log IR) were determined for a laminated ceramic capacitor of each obtained sample. Here, the dielectric constant was measured under the conditions of 25° C., 1 kHz, and 0.5 Vrms. The insulation resistance was measured after applying a DC voltage of 6.3 V for 180 seconds at 25° C. These results are shown in Table 2.

TABLE 2

| Sample No. | Dielectric constant | logIR(Ω) |
|---|---|---|
| 1* | 1920 | 9.2 |
| 2* | 2510 | 9.4 |
| 3* | 2920 | 9.3 |
| 4 | 3820 | 9.2 |
| 5 | 3940 | 9.3 |
| 6 | 4050 | 9.1 |
| 7 | 4190 | 9.1 |
| 8* | 4410 | 7.9 |
| 9* | 4520 | 7.5 |
| 10* | 3050 | 8.2 |
| 11* | 3210 | 8.1 |
| 12 | 5840 | 9.4 |
| 13 | 7650 | 9.5 |

In Table 1 and Table 2, the samples marked with "*" are out of the scope of the present invention.

Samples 4 to 7 within the scope of the present invention satisfy the condition that grain size distribution of the crystal grains has at least two peaks, the first crystal grains and the second crystal grains respectively have a peak of grain size distribution, and the areal percentage of the first crystal grains falls within the range of 41 to 69%. As a result, these Samples 4 to 7 showed excellent characteristics with regard to both the dielectric constant and insulation property (log IR).

In any of Samples 1 to 3, the areal percentage of the first crystal grains was less than 41%. In samples 1 and 2, in particular, a peak was not observed in grain size distribution of the first crystal grains. As a result, high insulation property (log IR) was obtained, while the dielectric constant was low in Samples 1 to 3.

In both of Samples 8 and 9, the areal percentage of the first crystal grains was more than 69%. In Sample 9, in particular, a peak was not observed in grain size distribution of the second crystal grains. As a result, a high dielectric constant was obtained, but the insulation property (log IR) was low in Samples 8 and 9.

This would be associated with the fact that grain boundary between crystal grains greatly contributes on insulation property, and for improving the insulation property, it is advantageous to increase the grain boundary or to decrease the grain size. In particular, the line of one-fourth of the thickness of the dielectric ceramic layer is regarded as the point where the influence on the insulation property suddenly changes, namely a critical point.

In Samples 10 and 11, the grain size distribution of crystal grains did not have two peaks. As a result, both the dielectric constant and insulation property (log IR) were low in Samples 10 and 11.

Sample 12 has a thickness of the dielectric ceramic layer of 1.6 μm, and Sample 13 has a thickness of the dielectric ceramic layer of 2.4 μm. Like the cases of Samples 4 to 7, these Samples 12 and 13 satisfy the condition that grain size distribution of crystal grains has at least two peaks, the first crystal grains and the second crystal grains respectively have a peak of grain size distribution, and the areal percentage of the first crystal grains falls within the range of 41 to 69%. These Samples 12 and 13 also showed excellent characteristics for both the dielectric constant and insulation property (log IR).

Test Example 2

In the $ABO_3$ a main ingredient of dielectric ceramic forming a dielectric ceramic layer of a laminated ceramic capacitor according to the present invention, site A essentially contains Ba which may partly be replaced by at least one of Ca and Sr, and site B essentially contains Ti which may partly be replaced by at least one of Zr and Hf. In Test example 2, evaluation of electrical characteristics was made while varying respective quantities of replacement of Ca and Sr in site A, and respective quantities of replacement of Zr and Hf in site B.

(A) Preparation of Dielectric Ceramic Material

First, as a starting material of main ingredients, powders of $BaCO_3$, $CaCO_3$, $SrCO_3$, $TiO_2$, $ZrO_2$ and $HfO_2$ were prepared, and these powders were weighed as shown in Table 3, mixed by a ball mill and heat-treated at 1100 to 1200° C., to obtain $BaTiO_3$-based $ABO_3$ powder. The mean particle size of the powder was 0.11 to 0.17 μm.

TABLE 3

| Sample No. | Replacing ingredient of site A Breakdown | Content (part by mol) | Replacing ingredient of site B Breakdown | Content (part by mol) |
|---|---|---|---|---|
| 101 | — | 0 | — | 0 |
| 102 | 0.6Ca | 0.6 | — | 0 |
| 103 | 1.8Ca, 0.2Sr | 2 | — | 0 |
| 104 | 4.2Ca, 0.5Sr | 4.7 | — | 0 |
| 105 | 8.0Ca | 8 | — | 0 |
| 106 | 2.5Ca | 2.5 | 1.5Zr | 1.5 |
| 107 | — | 0 | 2Zr, 0.2Hf | 2.2 |
| 108 | — | 0 | 4.5Zr, 0.3Hf | 4.8 |
| 109 | 7.5Ca, 0.3Sr | 7.8 | 1Zr, 0.2Hf | 1.2 |
| 110 | 2Ca, 0.2Sr | 2.2 | 0.6Zr | 0.6 |
| 111 | 9.7Ca, 0.3Sr | 10 | 2Zr, 0.1Hf | 2.1 |
| 112 | 3.4Ca, 0.1Sr | 3.5 | 3Zr | 3 |
| 113 | 5.5Ca | 5.5 | 3.5Zr, 0.5Hf | 4 |
| 114 | 2.5Ca, 0.2Sr | 2.7 | 5Zr, 0.3Hf | 5.3 |
| 115 | 8.15Ca, 0.05Sr | 8.2 | 3.5Zr | 3.5 |
| 116 | — | 0 | 0.5Zr | 0.5 |
| 117 | 2Ca | 2 | 5.8Zr, 0.2Hf | 6 |

On the other hand, as the accessory ingredients, powders of $BaCO_3$, $Y_2O_3$, $MgCO_3$, $MnCO_3$, $V_2O_5$ and $SiO_2$ were prepared.

The above $ABO_3$ powder was stirred in water as a medium for 24 hours by a ball mill so that monodispersing was effected as much as possible. Next, the above accessory ingredient powders were added, mixed for 24 hours by a ball mill, and then evaporated and dried. In this mixture, the blending proportions of the accessory ingredients were selected so that $BaCO_3$ was 1 mol, $Y_2O_3$ was 0.5 mol, $MgCO_3$ was 0.5 mol, $MnCO_3$ was 0.1 mol, $V_2O_5$ was 0.05 mol and $SiO_2$ was 1.5 mol, relative to 100 mol of $ABO_3$.

Then through the same operation as in the case of Sample 6 in Test example 1, a dielectric ceramic material according to a sample was obtained.

(B) Preparation of Laminated Ceramic Capacitor

Through the same operation as in the case of Sample 6 in Test example 1, a laminated ceramic capacitor according to a sample was obtained.

(C) Analysis of Ceramic Structure

Analysis was executed in the same manner as in the case of Test example 1. As a result, a generally equivalent result as in Sample 6 in Test example 1 was obtained for all of Samples 101 to 109. That is, they satisfied the condition that grain size distribution of crystal grains has at least two peaks, the first crystal grains and the second crystal grains respectively have a peak of grain size distribution, and the areal percentage of the first crystal grains falls within the range of 41 to 69%.

(D) Evaluation of Electric Characteristics

Evaluation was executed in the same manner as in the case of Test example 1. The result is shown in Table 4.

TABLE 4

| Sample No. | Dielectric constant | logIR(Ω) |
|---|---|---|
| 101 | 4210 | 9.2 |
| 102 | 4190 | 9.2 |
| 103 | 4140 | 9.2 |
| 104 | 4050 | 9.3 |
| 105 | 3870 | 9.3 |
| 106 | 4170 | 9.3 |
| 107 | 4300 | 9.2 |
| 108 | 4410 | 9.3 |
| 109 | 3950 | 9.4 |
| 110 | 4160 | 9.3 |
| 111 | 3890 | 9.4 |
| 112 | 4190 | 9.3 |
| 113 | 4140 | 9.4 |
| 114 | 4330 | 9.3 |

TABLE 4-continued

| Sample No. | Dielectric constant | logIR($\Omega$) |
|---|---|---|
| 115 | 4000 | 9.4 |
| 116 | 4230 | 9.2 |
| 117 | 4370 | 9.3 |

As is recognized from Table 4, any of Samples 101 to 109 showed excellent characteristics with regard to both the dielectric constant and insulation property (log IR).

Test Example 3

In Test example 3, when composition of dielectric ceramic is represented by the composition formula: $[100A_mBO_3]+aRO_{3/2}+bMO+cSiO_2$, the electric characteristics were evaluated while varying R among at least one of La, Ce, Pr, Nd, Sm, Eu, Gd, Tb, Dy, Ho, Er, Tm, Yb, Lu and Y, and varying M among at least one of Mn, Ni, Co, Fe, Cr, Cu, Mg, Li, Al, Mo, W and V, and varying m, a, b and c in various ways.

(A) Preparation of Dielectric Ceramic Material

Starting material powders were prepared so that compositions as shown in Table 5 were obtained in the composition formula: $[100A_mBO_3]+aRO_{3/2}+bMO+cSiO_2$, and these powders were weighed, mixed by a ball mill, and subjected to the same operation as in the case of Sample 6 of Test example 1, to obtain a dielectric ceramic material having the composition represented by the above composition formula.

TABLE 5

| Sample No. | m | Breakdown of component R | Breakdown of component M | b | c |
|---|---|---|---|---|---|
| 301 | 1.005 | 0.6Nd, 0.6Sm | 1.2 1Mg, 0.4Fe, 0.1V | 1.5 | 1.0 |
| 302 | 1.009 | 0.6Dy, 0.7Ho | 1.3 0.2V, 0.3W, 0.5Al | 1 | 1.3 |
| 303 | 0.983 | 0.3Ce, 0.5Sm | 0.8 0.2Mn, 0.5Mg | 0.7 | 2.2 |
| 304 | 1.011 | 0.7Eu | 0.7 0.9W, 0.3Fe | 1.2 | 1.8 |
| 305 | 1.010 | 0.2Ho, 0.3Eu, 0.7Y | 1.2 0.2V | 0.2 | 2.3 |
| 306 | 0.998 | 0.4Ce, 0.3Lu | 0.7 0.5Mn, 0.1Cr | 0.6 | 1.4 |
| 307 | 0.978 | 0.6Lu, 0.4Dy | 1.0 0.3Mn, 0.3Mo | 0.6 | 0.7 |
| 308 | 0.996 | 0.6La, 1.8Gd | 2.4 0.1Ni, 1.4Mg | 1.5 | 1.3 |
| 309 | 1.010 | 0.7Dy, 0.8Er | 1.5 0.6Mo | 0.6 | 2.5 |
| 310 | 0.960 | 0.2Ce, 0.8Nd | 1.0 0.3Mn | 0.3 | 0.8 |
| 311 | 1.030 | 0.3Pr, 1.0Nd | 1.3 0.3Cr, 0.4Al | 0.7 | 3.0 |
| 312 | 1.015 | 0.1Er | 0.1 0.1Al, 0.3Cr | 0.4 | 0.5 |
| 313 | 1.006 | 0.5Nd, 1.0Y | 3.0 1.0Mg, 0.2Mn | 1.2 | 2.3 |
| 314 | 1.006 | 0.2Tm, 0.2Y | 0.4 0.2Al | 0.2 | 2.0 |
| 315 | 0.966 | 0.1Dy, 0.2Lu | 0.3 2Mg, 0.4Mn, 0.6Cu | 3 | 3.2 |
| 316 | 0.971 | 0.4Tb, 0.5Ho | 0.9 0.2Mn, 0.2V | 0.4 | 0.1 |
| 317 | 1.020 | 0.4Pr, 0.5Er | 0.9 0.1Mn, 0.3Co, 0.8Mg | 1.2 | 3.5 |

(B) Preparation of Laminated Ceramic Capacitor

Through the same operation as in the case of sample 6 in Test example 1, laminate ceramic capacitor samples were obtained.

(C) Analysis of Ceramic Structure

Analysis was executed in the same manner as in the case of Test example 1. As a result, a generally equivalent result as in Sample 6 in Test example 1 was obtained for all of Samples 301 to 317. That is, they satisfied the condition that grain size distribution of crystal grains has at least two peaks, the first crystal grains and the second crystal grains respectively have a peak of grain size distribution, and the areal percentage of the first crystal grains falls within the range of 41 to 69%.

(D) Evaluation of Electric Characteristics

Evaluation was executed in the same manner as in the case of Test example 1. The result is shown in Table 6.

TABLE 6

| Sample No. | Dielectric constant | logIR($\Omega$) |
|---|---|---|
| 301 | 4060 | 9.2 |
| 302 | 4070 | 9.0 |
| 303 | 4320 | 9.4 |
| 304 | 4170 | 9.1 |
| 305 | 4160 | 9.2 |
| 306 | 4270 | 9.2 |
| 307 | 4280 | 9.3 |
| 308 | 3880 | 9.0 |
| 309 | 4080 | 9.1 |
| 310 | 4390 | 9.4 |
| 311 | 4030 | 9.0 |
| 312 | 4330 | 9.1 |
| 313 | 4340 | 9.0 |
| 314 | 4340 | 9.3 |
| 315 | 4320 | 9.4 |
| 316 | 4340 | 9.3 |
| 317 | 4110 | 9.1 |

As is recognized from Table 6, all of Samples 301 to 317 showed excellent characteristics with regard to both the dielectric constant and insulation property (log IR).

Test Example 4

Test example 4 evaluates influence of impurities. In other words, at least one of Sr, Zr, Hf, Zn, Na, Ag, Ni, B, Y, Al and Pd can enter as impurities in the production process of a laminated ceramic capacitor such as during preparation of material, and such impurities can be present in a crystal grain and in a crystal grain boundary between crystal grains. Also in a burning step of a laminated ceramic capacitor and so on, an internal electrode ingredient can diffuse and be present in a crystal grain and in a crystal grain boundary occupying between crystal grains.

(A) Preparation of Dielectric Ceramic Material

Through the same operation as in the case of Test example 2 except that impurities shown in Table 7 were added to the composition of Sample 101 in Test example 2, a dielectric ceramic material according to each sample was obtained.

TABLE 7

| Sample No. | Impurity ingredient Breakdown | Total (part by mol) |
|---|---|---|
| 101 | 0 | 0 |
| 401 | 0.4Zr, 0.01Zn, 0.01Ag | 0.42 |
| 402 | 0.3Zr, 0.05Hf, 0.03Ag | 0.38 |
| 403 | 0.1Zr, 0.1Zn | 0.2 |
| 404 | 0.6Ni, 0.02Zn, 0.03Na | 0.65 |
| 405 | 7Ni | 7 |
| 406 | 0.7Al, 0.2B, 0.01Pd | 0.91 |
| 407 | 0.1Zr, 0.01Pd | 0.11 |
| 408 | 0.8Zr, 0.1Ni, 0.07Sr | 0.97 |
| 409 | 0.7Zr, 0.03Y, 0.01Pd | 0.74 |

(B) Preparation of Laminated Ceramic Capacitor

Through the same operation as in the case of Sample 101 in Test example 2, laminated ceramic capacitor samples were obtained.

(C) Analysis of Ceramic Structure

Analysis was executed in the same manner as in the case of Test example 2. As a result, a generally equivalent result as in Sample 101 in Test example 2 was obtained for all of Samples 401 to 409. That is, they satisfied the condition that grain size distribution of crystal grains has at least two peaks, the first crystal grains and the second crystal grains respectively have a peak of grain size distribution, and the areal percentage of the first crystal grains falls within the range of 41 to 69%.

(D) Evaluation of Electric Characteristics

Evaluation was executed in the same manner as in the case of Test example 2. The result is shown in Table 8.

TABLE 8

| Sample No. | Dielectric constant | logIR($\Omega$) |
|---|---|---|
| 101 | 4210 | 9.2 |
| 401 | 4170 | 9.2 |
| 402 | 4180 | 9.2 |
| 403 | 4190 | 9.2 |
| 404 | 4160 | 9.2 |
| 405 | 3620 | 9.1 |
| 406 | 4130 | 9.2 |
| 407 | 4200 | 9.2 |
| 408 | 4130 | 9.2 |
| 409 | 4150 | 9.2 |

As is recognized from Table 8, all of Samples 401 to 409 showed excellent characteristics with regard to both the dielectric constant and insulation property (log IR).

Test Example 5

In Test example 5, the influence by different kinds of sintering aids was examined using Si-containing sintering aids having different compositions.

(A) Preparation of Dielectric Ceramic Material

Through the same operation as in the case of Sample 6 in Test example 1 except that a sintering aid having the composition shown in Table 9 was used in place of Si as a sintering aid ingredient in the composition of Sample 6 in Test example 1, a dielectric ceramic material according to each sample was obtained.

TABLE 9

| | Sintering aid | |
|---|---|---|
| Sample No. | Breakdown | Content (part by mol) |
| 6 | 1.5Si | 1.5 |
| 501 | 0.1Si, 0.4Li, 0.4Na, 0.1Ti | 1 |
| 502 | 1.8Si, 0.4B, 0.4Na | 2.6 |
| 503 | 1.0Si, 0.3Li | 1.3 |
| 504 | 1.5Si, 0.5B, 0.3K | 2.3 |
| 505 | 2.1Si, 0.4Li, 0.4Na | 2.9 |
| 506 | 0.1Si, 0.1B, 0.2Ba | 0.4 |
| 507 | 0.2Si, 0.1Mg | 0.3 |
| 508 | 0.25Si, 0.25Ti | 0.5 |
| 509 | 0.05Si, 0.05B | 0.1 |

(B) Preparation of Laminated Ceramic Capacitor

Through the same operation as in the case of Sample 6 in Test example 1, laminated ceramic capacitor samples were obtained.

(C) Analysis of Ceramic Structure

Analysis was executed in the same manner as in the case of Test example 1. As a result, a generally equivalent result as in Sample 6 in Test example 1 was obtained for any of Samples 501 to 509. That is, they satisfied the condition that grain size distribution of crystal grains has at least two peaks, the first crystal grains and the second crystal grains respectively have a peak of grain size distribution, and the areal percentage of the first crystal grains falls within the range of 41 to 69%.

(D) Evaluation of Electric Characteristics

Evaluation was executed in the same manner as in the case of Test example 1. The result is shown in Table 10.

TABLE 10

| Sample No. | Dielectric constant | logIR($\Omega$) |
|---|---|---|
| 6 | 4050 | 9.1 |
| 501 | 4130 | 9.1 |
| 502 | 4260 | 9.0 |
| 503 | 4160 | 9.1 |
| 504 | 4240 | 9.0 |
| 505 | 4280 | 9.0 |
| 506 | 4080 | 9.1 |
| 507 | 4070 | 9.1 |
| 508 | 4090 | 9.1 |
| 509 | 4060 | 9.1 |

As is realized from Table 10, all of Samples 501 to 509 showed excellent characteristics with regard to both the dielectric constant and insulation property (log IR).

What is claimed is:

1. A laminated ceramic capacitor comprising:
a plurality of laminated dielectric ceramic layers; and
a pair of internal electrodes between different adjacent interfaces between the dielectric ceramic layers,
wherein the dielectric ceramic layers comprise a dielectric ceramic containing a perovskite-type compound represented by $ABO_3$ in which A is Ba and optionally also contains at least one of Ca and Sr, and B is Ti and optionally contains at least one of Zr and Hf as a main ingredient, and R, M (and Si as accessory ingredients in which R is at least one member selected from the group consisting of La, Ce, Pr, Nd, Sm, Eu, Gd, Tb, Dy, Ho, Er, Tm, Yb, Lu and Y) and M is at least one member selected from the group consisting of Mn, Ni, Co, Fe, Cr, Cu, Mg, Li, Al, Mo, W and V, and
wherein when the crystal grains contained in the dielectric ceramic are classified into first crystal grains having grain sizes larger than one-fourth of the thickness of the dielectric ceramic layer and second crystal grains having grain sizes not larger than one-fourth of the thickness of the dielectric ceramic layer, each of the first crystal grains and the second crystal grains have a peak of grain size distribution, and the areal percentage of the first crystal grains on a cross section of the dielectric ceramic layer is 41 to 69%.

2. The laminated ceramic capacitor according to claim 1, wherein A contains 78 to 100% by mol of Ba, 0 to 2% by mol of Sr, and 0 to 20% by mol of Ca; and B contains 96 to 100% by mol of Ti, 0 to 2% by mol of Zr, and 0 to 2% by mol of Hf.

3. The laminated ceramic capacitor according to claim 2, wherein respective concentrations of R, M and Si as the accessory ingredients of the dielectric ceramic fall within ranges of 0.1 to 3.0 mol, 0.2 to 5 mol and 0.1 to 3.5 mol by element, respectively, relative to 100 mol of $ABO_3$, and the ratio A/B in $ABO_3$ is 0.96 to 1.030.

4. The laminated ceramic capacitor according to claim 3, wherein A contains one of Ca and Sr, and B contains one of Zr and Hr.

5. The laminated ceramic capacitor according to claim 3, wherein A contains Ca and Sr, and B contains Zr and Hr.

6. The laminated ceramic capacitor according to claim 3, wherein one of A and B contains at least one of said optional elements and the other of A and B does not contain one of said optional elements.

7. The laminated ceramic capacitor according to claim 1, wherein respective concentrations of R, M and Si as the accessory ingredients of the dielectric ceramic fall within ranges of 0.1 to 3.0 mol, 0.2 to 5 mol and 0.1 to 3.5 mol by element, respectively, relative to 100 mol of $ABO_3$, and the ratio A/B in $ABO_3$ is 0.96 to 1.030.

8. The laminated ceramic capacitor according to claim 1, wherein $ABO_3$ is $BaTiO_3$.

9. The laminated ceramic capacitor according to claim 8, wherein respective concentrations of R, M and Si as the accessory ingredients of the dielectric ceramic fall within ranges of 0.1 to 3.0 mol, 0.2 to 5 mol and 0.1 to 3.5 mol by element, respectively, relative to 100 mol of $ABO_3$, and the ratio A/B in $ABO_3$ is 0.96 to 1.030.

10. The laminated ceramic capacitor according to claim 1, wherein A is one of Ca and Sr; and B is one of Zr and Hf.

11. The laminated ceramic capacitor according to claim 10, wherein respective concentrations of R, M and Si as the accessory ingredients of the dielectric ceramic fall within ranges of 0.1 to 3.0 mol, 0.2 to 5 mol and 0.1 to 3.5 mol by element, respectively, relative to 100 mol of $ABO_3$, and the ratio A/B in $ABO_3$ is 0.96 to 1.030.

12. The laminated ceramic capacitor according to claim 1, wherein A contains Ca and Sr; and B contains Zr and Hf.

13. The laminated ceramic capacitor according to claim 12, wherein respective concentrations of R, M and Si as the accessory ingredients of the dielectric ceramic fall within ranges of 0.1 to 3.0 mol, 0.2 to 5 mol and 0.1 to 3.5 mol by element, respectively, relative to 100 mol of $ABO_3$, and the ratio A/B in $ABO_3$ is 0.96 to 1.030.

14. The laminated ceramic capacitor according to claim 1, wherein R and M each contain one member of the group.

15. The laminated ceramic capacitor according to claim 1, wherein R and M each contain more than one member of the group.

16. The laminated ceramic capacitor according to claim 1, wherein one of R and M contains one member of the group, and the other of R and M contain more than one member of the group.

* * * * *